United States Patent
Shimamura et al.

(10) Patent No.: US 11,145,143 B2
(45) Date of Patent: Oct. 12, 2021

(54) UNMANNED WORK SYSTEM, MANAGEMENT SERVER, AND UNMANNED WORK MACHINE

(71) Applicant: HONDA MOTOR CO., LTD., Tokyo (JP)

(72) Inventors: Hideaki Shimamura, Wako (JP); Yuki Matsui, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 263 days.

(21) Appl. No.: 16/467,773

(22) PCT Filed: Jan. 31, 2017

(86) PCT No.: PCT/JP2017/003460
§ 371 (c)(1),
(2) Date: Jun. 7, 2019

(87) PCT Pub. No.: WO2018/142482
PCT Pub. Date: Aug. 9, 2018

(65) Prior Publication Data
US 2019/0304211 A1 Oct. 3, 2019

(51) Int. Cl.
*G07C 5/00* (2006.01)
*A01D 34/00* (2006.01)
(Continued)

(52) U.S. Cl.
CPC .......... *G07C 5/008* (2013.01); *A01D 34/008* (2013.01); *G06Q 10/00* (2013.01); *G06Q 50/02* (2013.01);
(Continued)

(58) Field of Classification Search
CPC ........ G07C 5/008; G07C 5/08; A01D 34/008; A01D 2101/00; G06Q 10/00; G06Q 50/02;
(Continued)

(56) References Cited

U.S. PATENT DOCUMENTS

2014/0032033 A1 1/2014 Einecke et al.
2015/0204758 A1 7/2015 Schnell et al.
(Continued)

FOREIGN PATENT DOCUMENTS

EP 2884364 A1 6/2015
JP S55-48314 A 4/1980
(Continued)

OTHER PUBLICATIONS

European Search Report dated Dec. 9, 2019, 8 pages.
(Continued)

*Primary Examiner* — Gertrude Arthur Jeanglaude
(74) *Attorney, Agent, or Firm* — Rankin, Hill & Clark LLP

(57) ABSTRACT

An unmanned lawn mowing system includes a plurality of unmanned lawn mowers that perform work while traveling without a human operator and a management server. Each of the unmanned lawn mowers includes an information transmission section that transmits operation information including information indicating a work state to the management server. The management server includes: a case storage section that stores a case related to a failure in and/or a case related to maintenance of each of the unmanned lawn mowers; a maintenance determination section that determines whether or not maintenance of the unmanned lawn mower is necessary, based on the case associated with operation information identical or similar to the operation information; and a maintenance notification transmission (Continued)

section that notifies maintenance to the unmanned lawn mowers, based on a determination result made by the maintenance determination section.

9 Claims, 6 Drawing Sheets

(51) Int. Cl.
  *G07C 5/08* (2006.01)
  *G06Q 10/00* (2012.01)
  *G06Q 50/02* (2012.01)
  *A01D 101/00* (2006.01)
  *G05D 1/00* (2006.01)
  *G05D 1/02* (2020.01)

(52) U.S. Cl.
  CPC .......... *G07C 5/08* (2013.01); *A01D 2101/00* (2013.01); *G05D 1/0088* (2013.01); *G05D 1/0231* (2013.01); *G05D 2201/0208* (2013.01)

(58) Field of Classification Search
  CPC .............. G05D 1/0088; G05D 1/0231; G05D 2201/0208
  USPC .......................................................... 701/23
  See application file for complete search history.

(56) References Cited

U.S. PATENT DOCUMENTS

| | | | |
|---|---|---|---|
| 2016/0302354 A1 | 10/2016 | Franzius et al. | |
| 2018/0299285 A1* | 10/2018 | Morita | G08G 1/096811 |
| 2018/0326901 A1* | 11/2018 | Boyle | B60Q 1/503 |

FOREIGN PATENT DOCUMENTS

| | | |
|---|---|---|
| JP | H11-24744 | 1/1999 |
| JP | 2003-015877 | 1/2003 |
| JP | 5529947 | 4/2014 |
| JP | 2014-082974 A | 5/2014 |
| JP | 2016-158594 | 9/2016 |
| WO | 2015/161829 | 10/2015 |
| WO | WO-2015161829 A1 * | 10/2015 ............... B25F 5/00 |

OTHER PUBLICATIONS

European Office Action dated Aug. 24, 2020, 9 pages.
International Search Report, dated Apr. 18, 2017 (dated Apr. 18, 2017), 2 pages.
International Preliminary Report on Patentability dated Aug. 15, 2019, 8 pages.
Japanese Office Action with English translation, dated Sep. 15, 2020, 9 pages.

* cited by examiner

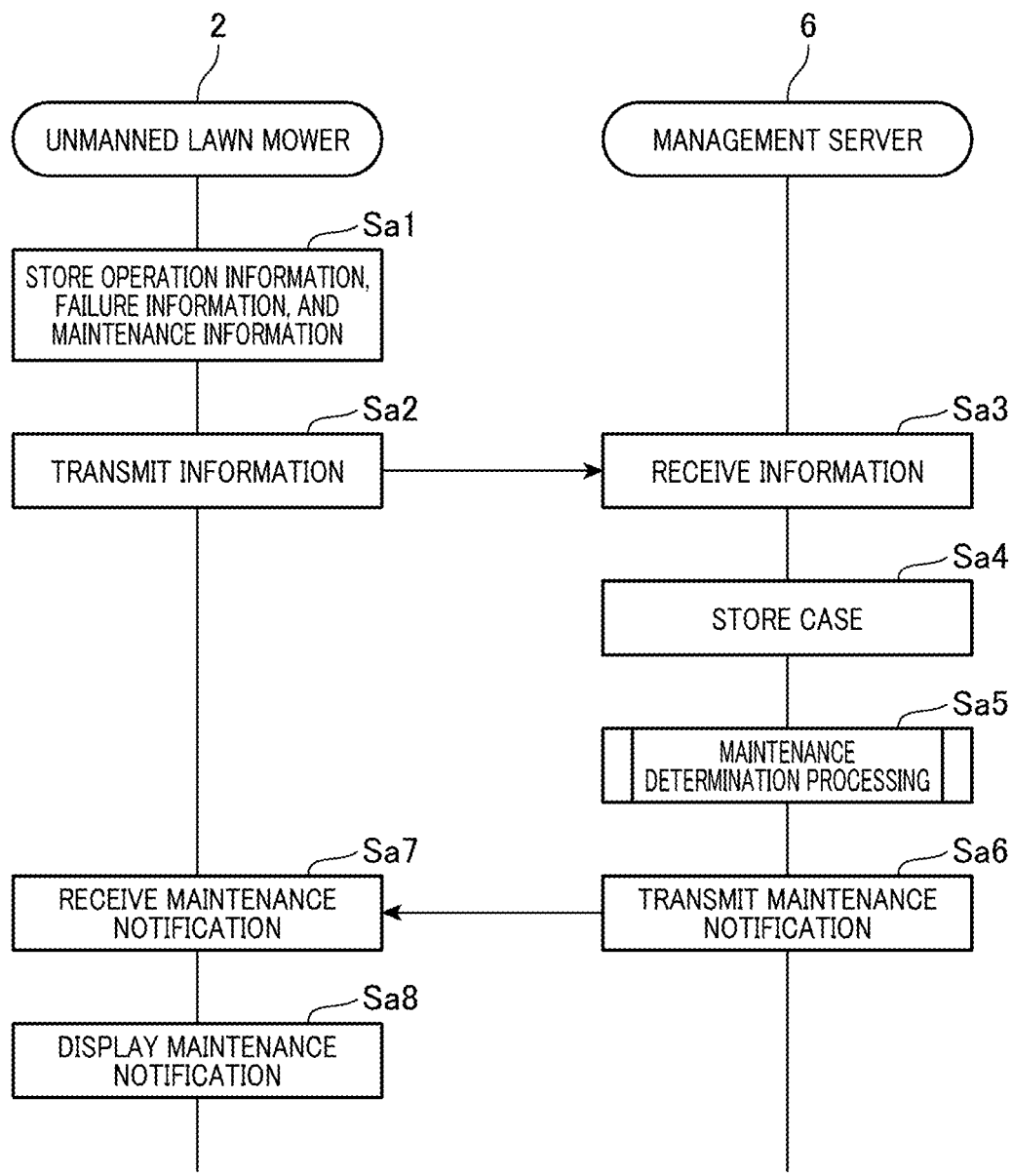

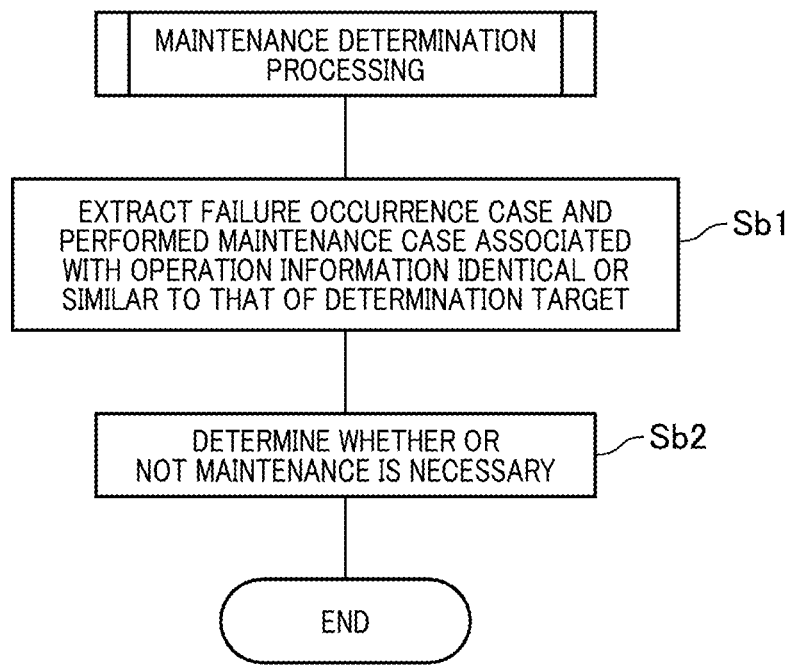

UNMANNED WORK SYSTEM, MANAGEMENT SERVER, AND UNMANNED WORK MACHINE

TECHNICAL FIELD

The present invention relates to a technology of notifying time for maintenance of an unmanned work machine.

BACKGROUND ART

As one of unmanned work machines that perform work while traveling without a human operator, an unmanned lawn mower (also referred to as "robot lawn mower" or "autonomous lawn mower"), which autonomously travels in a lawn area and mows grass, is conventionally known (for example, see Patent Literatures 1 to 3).

CITATION LIST

Patent Literature

[Patent Literature 1]
  Japanese Patent No. 5529947
[Patent Literature 2]
  Specification of U.S. Patent Application Publication No. 2016/0302354
[Patent Literature 3]
  Specification of U.S. Patent Application Publication No. 2014/0032033

SUMMARY OF INVENTION

Technical Problem

As a method for notifying maintenance time to a user, a method in which an unmanned lawn mower counts cumulative work time spent on lawn mowing work, and when the cumulative work time reaches a predetermined value, the unmanned lawn mower prompts the user to perform maintenance, can be conceived.

However, the cumulative work time after which maintenance is required varies with the individual unmanned lawn mower. Accordingly, there is a problem that maintenance is excessively performed, depending on unmanned work machines.

An object of the present invention is to provide an unmanned work system, a management server, and an unmanned work machine that make it possible to appropriately notify maintenance of an unmanned work machine.

Solution to Problem

An aspect of the present invention is an unmanned work system including: a plurality of unmanned work machines that perform work while traveling without a human operator; and a management server, each of the unmanned work machines and the management server communicating with each other, wherein each of the unmanned work machines includes: an information transmission section that transmits operation information including information indicating a work state to the management server, and the management server includes: a case storage section that stores a case related to a failure in and/or a case related to maintenance of each of the unmanned work machines in association with the operation information from each unmanned work machine from which the case or cases derive; a maintenance determination section that determines, when the operation information is transmitted from the unmanned work machines, whether or not maintenance of the unmanned work machines is necessary, based on the case associated with operation information identical or similar to the operation information; and a maintenance notification section that notifies maintenance to the unmanned work machines, based on a determination result made by the maintenance determination section.

According to the aspect of the present invention, in the unmanned work system, when the case related to a failure and/or the case related to maintenance occurs, each of the unmanned work machines transmits the case or cases, along with the operation information, to the management server, and the case storage section of the management server stores the case or cases and the operation information transmitted from the unmanned work machines.

According to the aspect of the present invention, in the unmanned work system, one or more pieces of information at least serving as a criterion or criteria to determine occurrence of the failure and/or a criterion or criteria to determine necessity of the maintenance, of information included in the operation information, are stored in association with the case or cases.

According to the aspect of the present invention, in the unmanned work system, each of the unmanned work machines includes a blade for mowing lawn grass, the operation information includes an average load value during lawn mowing work for mowing lawn grass, and the operation information indicating that the average load value exceeds a predetermined threshold value, the case of the maintenance due to abrasion of the blade, and the case of the maintenance due to dirt on a relevant one of the unmanned work machines are stored in the case storage section in association with each other.

According to the aspect of the present invention, in the unmanned work system, each of the unmanned work machines includes a camera that shoots a cut surface of the lawn grass mown by the blade and a mowing-target lawn area, the operation information includes image data obtained by shooting with the camera, and when the average load value exceeds the predetermined threshold value, the maintenance determination section identifies either the abrasion of the blade or the dirt on the relevant unmanned work machine, based on the image data of the cut surface of the lawn grass and the lawn area.

Another aspect of the present invention is a management server that mutually communicates with unmanned work machines that perform work while traveling without a human operator, including: a case storage section that stores a case related to a failure in and/or a case related to maintenance of each of the unmanned work machines in association with operation information including information indicating a work state of each unmanned work machine from which the case or cases derive; an information acquisition section that acquires the operation information from the unmanned work machines; a maintenance determination section that determines whether or not maintenance of the unmanned work machines is necessary, based on the case associated with operation information identical or similar to the operation information acquired by the information acquisition section; and a maintenance notification section that notifies maintenance to the unmanned work machines, based on a determination result made by the maintenance determination section.

Still another aspect of the present invention is an unmanned work machine that performs work while traveling without a human operator and mutually communicates with a management server, including: an information transmission section that transmits operation information including information indicating a work state; and a maintenance notification acquisition section that acquires a maintenance notification notifying maintenance from the management server, wherein the maintenance notification is generated by the management server, based on, of cases related to a failure and/or cases related to maintenance stored in association with the operation information from unmanned work machines, a case associated with operation information identical or similar to the operation information transmitted by the information transmission section.

Advantageous Effect of Invention

According to each aspect of the present invention, it is possible to appropriately notify maintenance of an unmanned work machine.

BRIEF DESCRIPTION OF DRAWINGS

FIG. 5 is a sequence diagram showing operations of the unmanned lawn mowing system.

FIG. 6 is a flowchart of maintenance determination processing.

DESCRIPTION OF EMBODIMENT

Hereinafter, an embodiment of the present invention will be described with reference to drawings.

Figure 1:
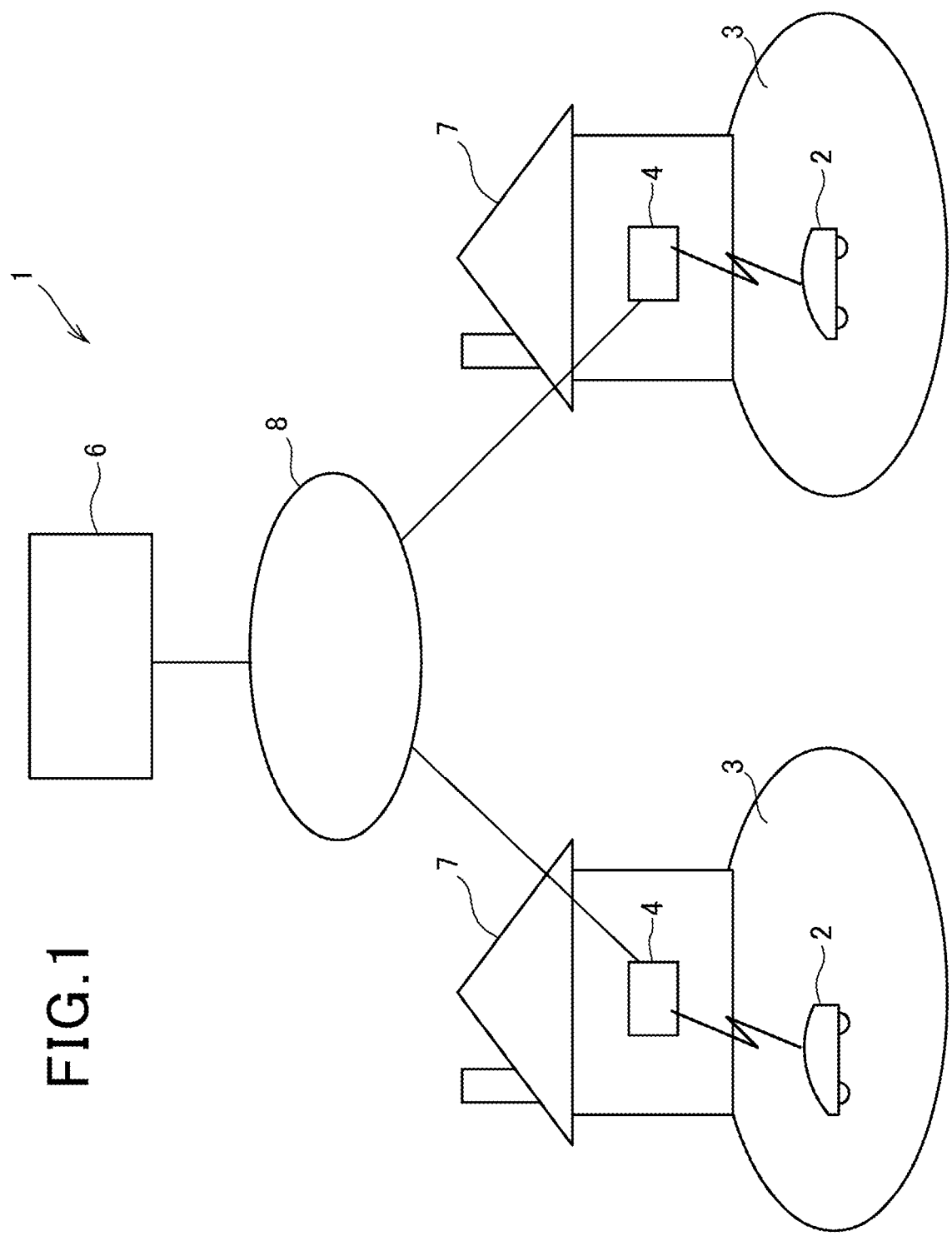
FIG. 1 shows a configuration of an unmanned lawn mowing system according to an embodiment of the present invention.

FIG. 1 shows a configuration of an unmanned lawn mowing system 1 according to the present embodiment.

The unmanned lawn mowing system 1 includes a plurality of unmanned lawn mowers 2, home terminals 4, and a management server 6.

Each unmanned lawn mower 2 is a lawn mower of an autonomous travel type, which travels in a lawn area 3 where grass grows and mows the grass without a human operator (that is, autonomously). Each home terminal 4 is an information processing apparatus owned by a user of an unmanned lawn mower 2 and mutually communicates with the management server 6 through a telecommunication circuit 8. For the home terminals 4, for example, a personal computer installed in a house 7 or a smartphone of the user is used. The telecommunication circuit 8 is, for example, a public circuit such as the Internet.

Each unmanned lawn mower 2 and each corresponding home terminal 4 bidirectionally communicate with each other by using short-range wireless communication. The home terminals 4 relay data to be transmitted and received between the unmanned lawn mowers 2 and the management server 6 by using the short-range wireless communication. For the short-range wireless communication, for example, Bluetooth®, IrDA, Wi-Fi, or the like is used.

The management server 6 is a server computer that manages the unmanned lawn mowers 2, and transmits and receives various data to/from the unmanned lawn mowers 2 via the telecommunication circuit 8 and the home terminals 4. Details of the management server 6 will be described later.

Figure 2:
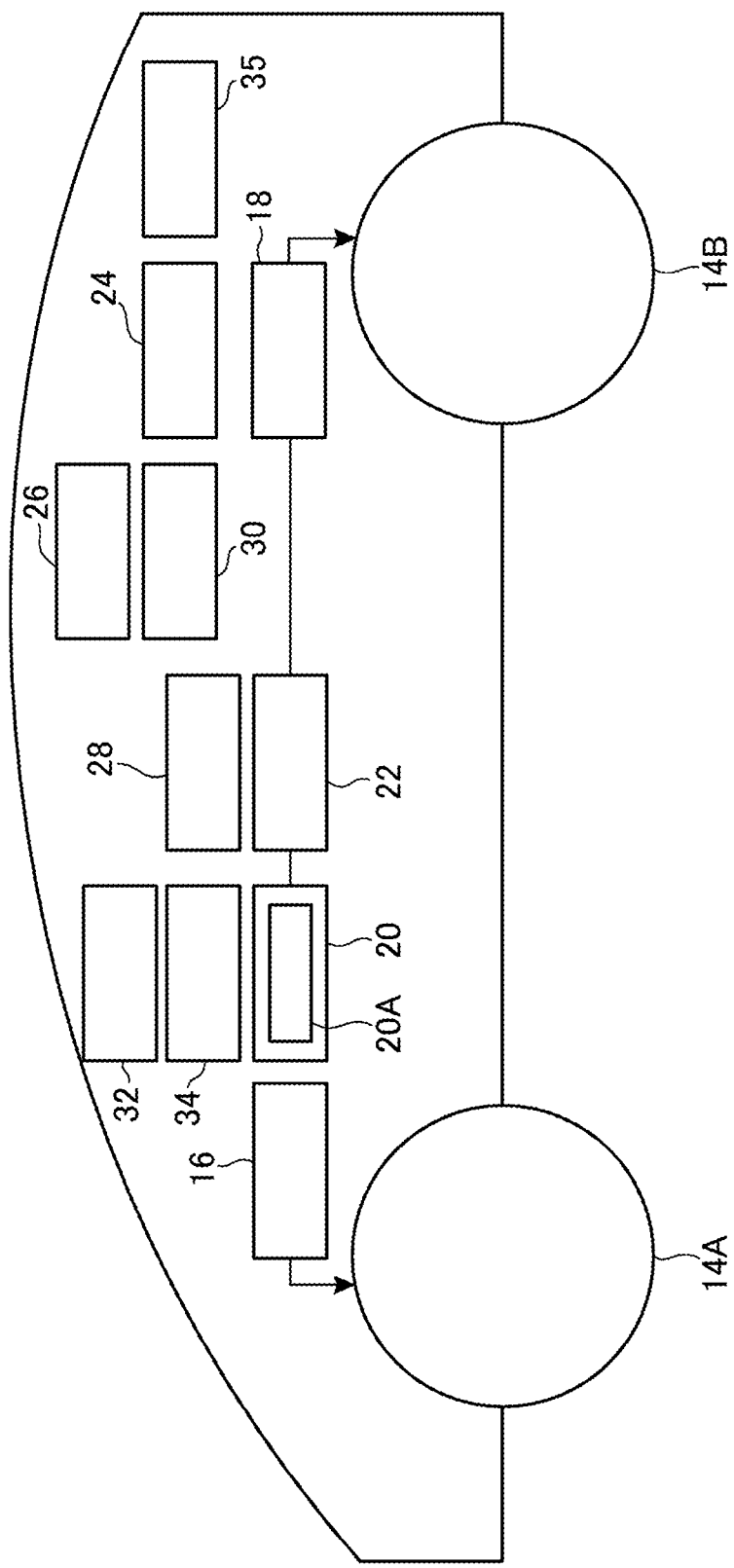
FIG. 2 shows a configuration of an unmanned lawn mower.

FIG. 2 schematically shows a configuration of one of the unmanned lawn mowers 2.

The unmanned lawn mower 2 includes a box-shaped main body 12. On a front portion of the main body 12, steerable front wheels 14A are provided on right and left sides, respectively, and on a rear portion, rear wheels 14B, which are driving wheels, are provided on right and left sides, respectively. The main body 12 is provided with a steering mechanism 16, a driving mechanism 18, a lawn mowing mechanism 20, an engine 22, a battery unit 24, a short-range wireless communication unit 26, a sensor unit 28, a control unit 30, an operation section 32, a display section 34, and a camera 35.

The steering mechanism 16 is a mechanism that steers the front wheels 14A, and includes a steering motor and a gear transmission mechanism that moves the front wheels 14A in right and left directions through rotation of the steering motor. The driving mechanism 18 is a mechanism that drives the rear wheels 14B, and includes a power transmission mechanism that transmits power of the engine 22 to the rear wheels 14B and thus drives the rear wheels 14B. The lawn mowing mechanism 20 includes a blade (cutting blade) 20A and a coupling mechanism that interlocks and couples the blade 20A with the engine 22 and thus rotates the blade 20A. The battery unit 24 includes a battery 24A and supplies electric power from the battery 24A to each part such as the engine 22. The short-range wireless communication unit 26 is a unit that performs short-range wireless communication with a corresponding one of the above-described home terminals 4. The sensor unit 28 includes various types of sensors required for autonomous travel in the lawn area 3 while obstacles (a house, a tree, and the like) are avoided. For such types of sensors, a sensor for detecting a boundary of the lawn area 3 (a magnetic sensor that detects an electric wire buried along the boundary K of the lawn area 3, or a positioning sensor such as a GPS sensor or a gyro sensor that detects a location of the machine 2 on which the sensor is mounted), and a sensor for detecting an obstacle (a contact detection sensor or the like) can be recited.

The control unit 30 is an apparatus that controls each part provided to the main body 12 and implements an autonomous lawn mowing action, and is configured with a computer including a processor such as a CPU or an MPU and a storage device such as a memory storing computer programs.

The operation section 32 includes various operation devices configured to receive an operation made by the user (a button, a numeric keypad, a touch panel, and the like), and outputs the operation to the control unit 30. The display section 34 includes a display panel and the like, and displays various information.

The camera 35 is an imaging sensor and shoots a state of lawn mowing work.

Figure 3:
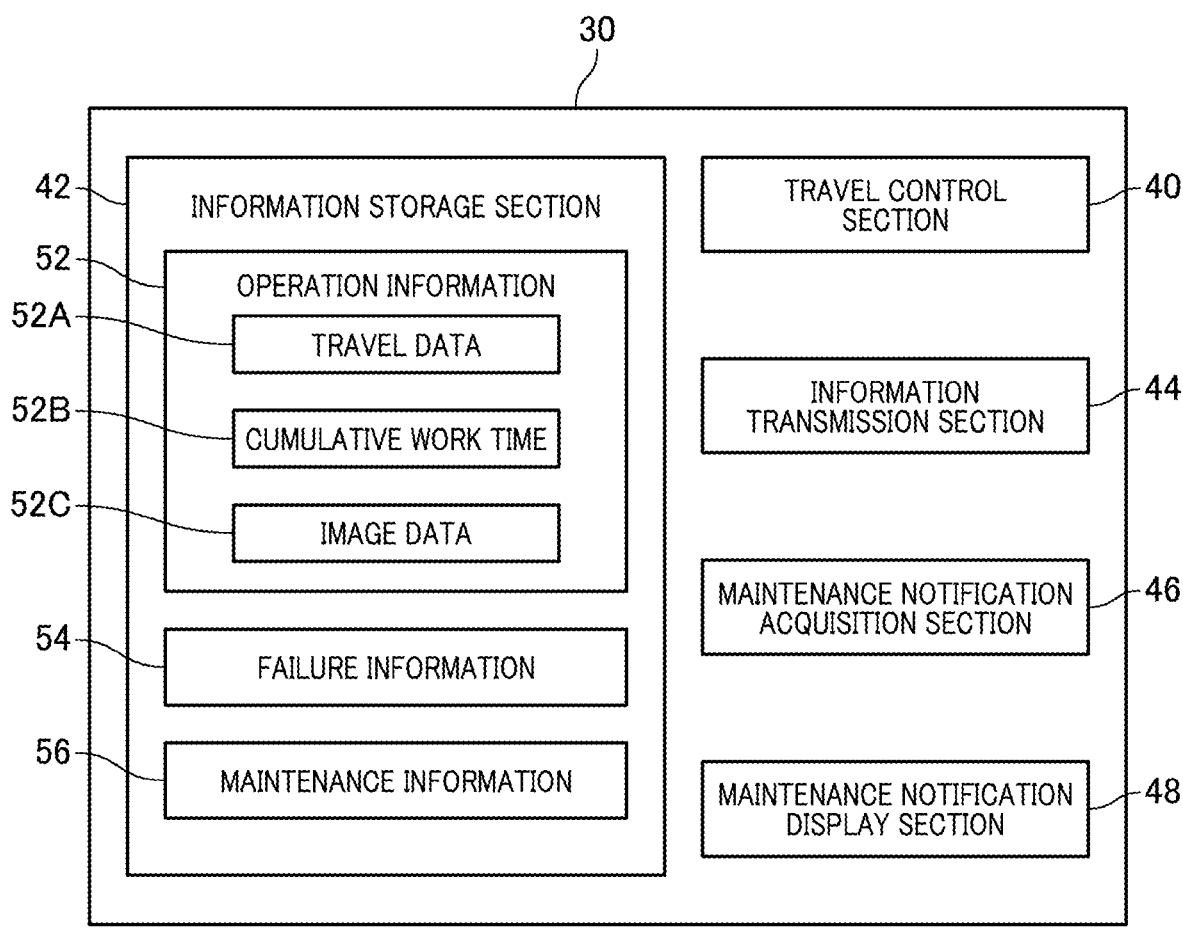
FIG. 3 is a block diagram showing a functional configuration of a control unit included in the unmanned lawn mower.

FIG. 3 is a block diagram showing a functional configuration of the control unit 30.

The control unit 30 includes a travel control section 40, an information storage section 42, an information transmission section 44, a maintenance notification acquisition section 46, and a maintenance notification display section 48.

The travel control section 40 performs control for performing lawn mowing work while traveling without a human operator (traveling autonomously).

The information storage section 42 is configured to store various information on the unmanned lawn mower 2, and in the present embodiment, stores operation information 52, failure information 54, and maintenance information 56.

The operation information 52 includes information indicating a state of lawn mowing work of the unmanned lawn mower 2. The state of lawn mowing work includes states of the unmanned lawn mower 2, the lawn area 3, and grass at time of lawn mowing work. In the present embodiment, the operation information 52 includes travel data 52A, cumulative work time 52B, and image data 52C.

The travel data 52A and the cumulative work time 52B are data related to the state of the unmanned lawn mower 2. The travel data 52A includes at least a travel distance of the unmanned lawn mower 2, the number of collisions, and an average load value. The average load value is an average value of a load applied to the lawn mowing mechanism 20 during lawn mowing work. The travel data 52A is sequentially collected during lawn mowing work.

The cumulative work time 52B is cumulative time of lawn mowing work and is counted up during lawn mowing work and cleared to zero each time maintenance of the unmanned lawn mower 2 is performed.

The image data 52C is data related to the states of the lawn area 3 and grass and, in the present embodiment, is image data from the camera 35. Specifically, the image data 52C includes a shot image of a mown surface of grass that has been mown and a shot image of the lawn area 3. The shot image of the mown surface of grass is used to determine abrasion of the blade 20A. The shot image of the lawn area 3 is used to check for existence of a lump of grass on the lawn. If a lump of grass exists, a probability is high that the unmanned lawn mower 2 is soiled.

The failure information 54 is information indicating a history of failures that have occurred in the unmanned lawn mower 2, and the failure information 54 in the present embodiment includes failure details. The failure details include, for example, a sensor failure, steering motor fixation, and various errors of the control unit 30 (for example, a state of difficulty in returning from an outside of the lawn area 3). Each failure detail may be recorded in association with the cumulative work time as necessary.

The maintenance information 56 is information indicating a history of maintenances that have been performed on the unmanned lawn mower 2 and includes maintenance details. The maintenance details include, for example, repair of a sensor, repair of an operation motor, replacement of the blade 20A, replacement of the battery 24A, and cleaning of the main body. A cause necessitating maintenance (periodic inspection, failure, part life, or the like) is recorded in association with a maintenance detail. Note that each maintenance detail may be recorded in association with the cumulative work time as necessary.

The information transmission section 44 transmits the operation information 52, the failure information 54, and the maintenance information 56 stored in the information storage section 42 to the management server 6. Timings of transmitting the information are when the failure information 54 or the maintenance information 56 is recorded as an update (that is, when new information is recorded) and each time an increase in the cumulative work time reaches a predetermined interval time length.

The maintenance notification acquisition section 46 acquires a maintenance notification from the management server 6. The maintenance notification is information notifying prompting to perform maintenance, along with a maintenance detail.

The maintenance notification display section 48 displays the maintenance notification and thus notifies the maintenance notification to the user.

Note that in the present embodiment, exchange of information between each of the information transmission section 44 and the maintenance notification acquisition section 46 and the management server 6 is performed through communication via the home terminal 4.

Figure 4:
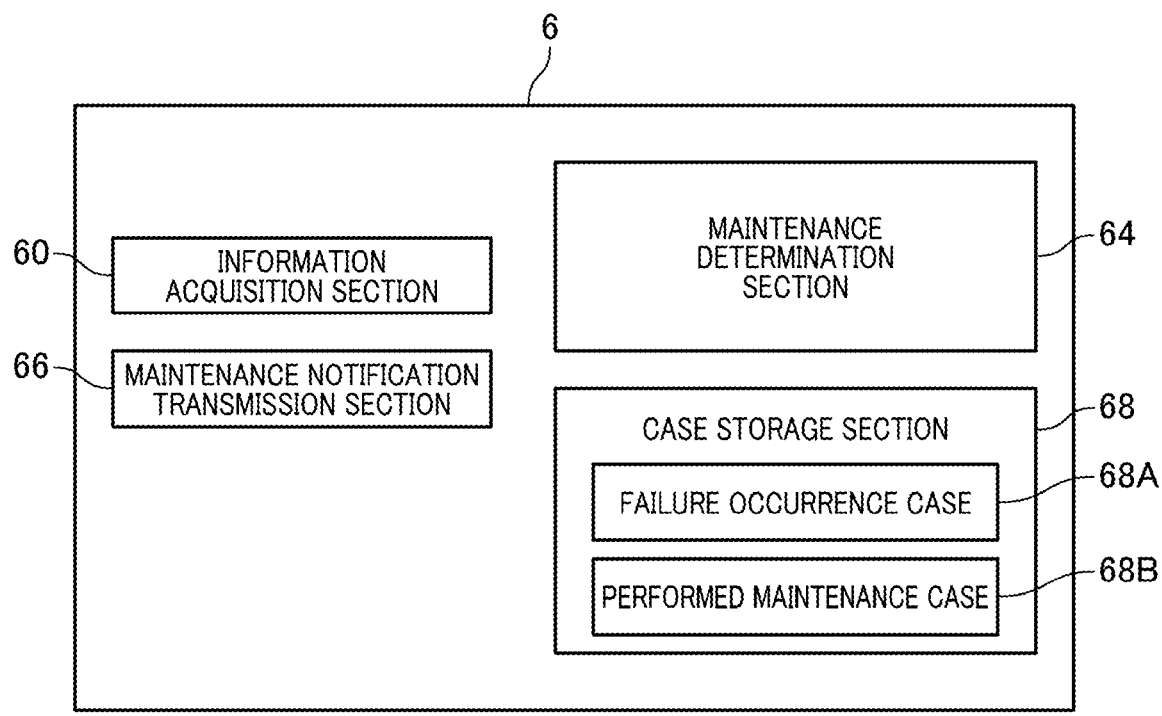
FIG. 4 is a block diagram showing a functional configuration of a management server.

FIG. 4 is a block diagram showing a functional configuration of the management server 6.

The management server 6 has a function of notifying the above-described maintenance notification to each of the unmanned lawn mowers 2 and includes an unmanned lawn mower information acquisition section 60, a maintenance determination section 64, a maintenance notification transmission section 66, and a case storage section 68.

The unmanned lawn mower information acquisition section 60 acquires the above-described operation information 52, failure information 54, and maintenance information 56 from each of the unmanned lawn mowers 2.

The maintenance determination section 64 determines whether or not maintenance of each unmanned lawn mower 2 is necessary, based on the information acquired from the unmanned lawn mower 2. Specific operations thereof will be described later.

If it is determined by the maintenance determination section 64 that maintenance of an unmanned lawn mower 2 is necessary, the maintenance notification transmission section 66 transmits the above-described maintenance notification notifying coming of maintenance time and a maintenance detail to the unmanned lawn mower 2 through the telecommunication circuit 8.

The case storage section 68 stores a failure occurrence case 68A and a performed maintenance case 68B, based on the information acquired from each of the unmanned lawn mowers 2.

The failure occurrence case 68A is a failure case that has occurred in an unmanned lawn mower 2. In the case storage section 68, the failure information 54 acquired from each unmanned lawn mower 2 is stored in association with the operation information 52.

The performed maintenance case 68B is a maintenance case that has occurred to an unmanned lawn mower 2. In the case storage section 68, the maintenance information 56 acquired from each unmanned lawn mower 2 is stored in association with the operation information 52.

Here, not all information included in the operation information 52 needs to be associated with the failure occurrence case 68A and the performed maintenance case 68B. That is, in the case storage section 68 in the present embodiment, one or more pieces of information at least serving as a criterion or criteria to determine occurrence of a failure and necessity of maintenance, of the information included in the operation information 52, are stored in association with the failure occurrence case 68A and the performed maintenance case 68B.

For example, since necessity of maintenance due to abrasion of the blade 20A can be determined based on the information on the average load value and the cut surface of grass, such pieces of information are associated with a performed maintenance case 68B of the blade 20A. For example, since necessity of maintenance due to dirt on the main body of an unmanned lawn mower 2 can be determined based on the information on the average load value and the existence of a lump of grass in the lawn area 3, such pieces of information are associated with a performed maintenance cases 68B related to cleaning of the unmanned lawn mower 2.

The information stored in the case storage section 68 is referred to when the maintenance determination section 64 determines whether or not maintenance of each unmanned lawn mowers 2 is necessary.

FIG. 5 is a sequence diagram showing operations of the unmanned lawn mowing system 1.

Each unmanned lawn mower 2 stores the operation information 52, the failure information 54, and the maintenance information 56 (step Sa1) and transmits the stored information to the management server 6 (step Sa2). In the present embodiment, the information is transmitted when the cumulative work time reaches the predetermined interval time length (for example, 20 hours or the like), or when a failure occurs, or when maintenance is performed.

Note that for the timing of transmitting the information, for example, a timing when the number of lawn mowing actions reaches a predetermined number (for example, one time, three times, ten times, or the like), a timing when a preset date and time arrive, or a timing when the user performs a predetermined operation, can be used.

When the management server 6 acquires the information transmitted from any one of the unmanned lawn mowers 2 (step Sa3), the management server 6, based on the information, stores the failure occurrence case 68A or/and the performed maintenance case 68B in the case storage section 68 (step Sa4). Note that an action of storing a case is performed when new failure information 54 or new maintenance information 56 is included in the information acquired from any one of the unmanned lawn mowers 2.

Next, the maintenance determination section 64 performs maintenance determination processing and determines whether or not maintenance of the unmanned lawn mower 2 is necessary (step Sa5). Note that details of the maintenance determination processing will be described later.

If maintenance is necessary, the maintenance notification transmission section 66 transmits a notification of prompting to perform maintenance as a maintenance notification, along with a maintenance detail, to the unmanned lawn mower 2 (step Sa6).

When the unmanned lawn mower 2 receives the maintenance notification from the management server 6 (step Sa7), the unmanned lawn mower 2 notifies the maintenance notification to the user by displaying the maintenance notification on the display section 34 (step Sa8). Thus, the user can learn that maintenance of the unmanned lawn mower 2 is necessary, before the unmanned lawn mower 2 fails.

FIG. 6 is a flowchart of the above-described maintenance determination processing.

In the present embodiment, the determination of necessity of maintenance is performed based on the operation information 52 from a determination-target unmanned lawn mower 2.

Specifically, the maintenance determination section 64 first extracts, from the case storage section 68, a failure occurrence case 68A and a performed maintenance case 68B with which identical or similar operation information 52 to the operation information 52 from the determination-target unmanned lawn mower 2 is associated (step Sb1).

In determination of identicalness or similarity of the operation information 52, if only partial information of the operation information 52 is associated with the failure occurrence case 68A and the performed maintenance case 68B, identicalness or similarity of the partial information is determined.

In the determination of similarity, determination is made integrally based on a degree of similarity of each determination-target information included in the operation information 52. For determination of the degree of similarity, an arbitrary determination method can be used, for example, setting a threshold value at which information is regarded as similar, for the determination-target information.

The operation information 52 is information indicating a state of lawn mowing work of the unmanned lawn mower 2, as described above. Accordingly, in the extraction processing, if a state of lawn mowing work of the determination-target unmanned lawn mower 2 is identical or similar to a state of lawn mowing work when a failure occurred in another unmanned lawn mower 2, and to a state of lawn mowing work when maintenance was performed on another unmanned lawn mower 2, a failure occurrence case 68A related to the failure and a performed maintenance case 68B related to the maintenance are extracted.

A description will be given specifically by using the average load value included in the travel data 52A in the operation information 52 as an example.

For performed maintenance cases 68B associated with a saturated state when the average load value is equal to or higher than a predetermined threshold value, maintenance due to abrasion of the blade 20A and maintenance due to dirt on the unmanned lawn mower 2 can cited, as described above.

Accordingly, at least any one of the above-mentioned maintenances is extracted when the operation information 52 from the determination-target unmanned lawn mower 2 indicates that the average load value is equal to or higher than the predetermined threshold value, which indicates the saturated state. Note that since the state of the cut surface of grass or the existence of a lump of grass in the lawn area 3 is also associated with the above-mentioned maintenances as described above, it is determined depending on the image data 52C and the average load value which maintenance is extracted.

Next, the maintenance determination section 64 determines whether or not maintenance is necessary, based on a result of the extraction in step Sb1 (step Sb2). For example, neither failure occurrence case 68A nor performed maintenance case 68B is extracted, the maintenance determination section 64 determines that "maintenance is unnecessary".

Conversely, when a failure occurrence case 68A or a performed maintenance case 68B is extracted, since a probability is high that the failure indicated by the failure occurrence case 68A will occur, or a probability is high that the maintenance indicated by the performed maintenance case 68B will become necessary, the maintenance determination section 64 determines that "maintenance is necessary".

In this case, for the maintenance detail in the maintenance notification, a maintenance detail required to prevent the failure from occurring or a maintenance detail of the performed maintenance case 68B is used.

For example, if a performed maintenance case 68B due to abrasion of the blade 20A is extracted, the maintenance detail is "replacement of the blade 20A". If a performed maintenance case 68B due to dirt on the unmanned lawn mower 2 is extracted, the maintenance detail is "cleaning of the unmanned lawn mower 2".

Note that the maintenance determination processing can be divided into more processing units, according to contents of the processing, and step Sb1 and step Sb2 can be configured to be a single processing unit.

As described above, according to the present embodiment, the following effects can be obtained.

The management server 6 in the present embodiment acquires the operation information 52 indicating a state of lawn mowing work from each unmanned lawn mower 2, and notifies maintenance to each unmanned lawn mower 2 based on a failure occurrence case 68A and a performed maintenance case 68B with which identical or similar operation information 52 to the operation information 52 is associated.

Thus, maintenance is notified to an unmanned lawn mower 2 presenting an identical or similar state of lawn mowing work to a state of lawn mowing work when a failure occurred or when maintenance was performed. Accordingly, the maintenance is notified to the user at a right timing before the failure occurs and before the maintenance becomes necessary.

According to the present embodiment, an unmanned lawn mower 2 to which at least one of a failure occurrence case 68A and a performed maintenance case 68B has occurred transmits the failure occurrence case 68A and/or the performed maintenance case 68B, along with the operation information 52, to the management server 6. The case storage section 68 of the management server 6 stores the failure occurrence case 68A and/or the performed maintenance case 68B and the operation information 52 transmitted from the unmanned lawn mower 2.

Thus, in the case storage section 68, cases related to a failure that has occurred in and a maintenance that has been performed on each unmanned lawn mower 2 can be speedily and efficiently collected, together with the then operation information 52 (that is, the then state of lawn mowing work).

According to the present embodiment, one or more pieces of information at least serving as a criterion or criteria to determine occurrence of a failure and/or necessity of maintenance, of the information included in the operation information 52, are stored in association with the failure occurrence case 68A and the performed maintenance case 68B.

Accordingly, occurrence of a failure in and necessity of maintenance of each unmanned lawn mower 2 are accurately and efficiently determined.

According to the present embodiment, the operation information 52 indicating that the average load value exceeds the predetermined threshold value, the case of maintenance performed due to abrasion of the blade 20A, and the case of maintenance performed due to dirt on the unmanned lawn mower 2 are stored in the case storage section 68 in association with each other.

Thus, before a problem occurs with a result of lawn mowing due to abrasion of the blade 20A or dirt on the unmanned lawn mower 2, maintenance prompting to replace the blade 20A and maintenance prompting to clean the unmanned lawn mower 2 can be notified to the user.

According to the present embodiment, when the average load value exceeds the predetermined threshold value, the management server 6 identifies any one of abrasion of the blade 20A and dirt on the unmanned lawn mower 2, based on the image data 52C of the cut surface of grass and the lawn area.

Thus, replacement of the blade 20A and cleaning of the unmanned lawn mower 2 can be individually notified to the user, each at an appropriate timing.

The above-described embodiment only illustrates an aspect of the present invention, and modifications and applications can be made arbitrarily without departing from the scope of the present invention.

The management server 6 may acquire the failure information 54 and the maintenance information 56 from a party that performs repair or maintenance of the unmanned lawn mowers 2 (for example, a support center).

The management server 6 may acquire, from each unmanned lawn mower 2, information indicating specifications of the unmanned lawn mower 2 and may associate the information indicating the specifications of the unmanned lawn mower 2 with the cases stored in the case storage section 68.

By narrowing down cases to be extracted from the case storage section 68 based on the specifications of the unmanned lawn mowers 2, a failure that may occur in and maintenance that may be performed on the determination-target unmanned lawn mower 2 can be identified with higher accuracy.

In the state of grass included in the state of lawn mowing work, a type and a growing state (height or the like) of grass may be included. The state of grass can be acquired from a user input to each unmanned lawn mower 2, or by image analysis based on the image data 52C obtained by shooting the lawn area 3, or the like.

The state of grass is stored in the case storage section 68 in association with the cases, whereby even if abrasion of the blade 20A and occurrence of damage or the like to the blade 20A differ with the type and growing state of grass, appropriate maintenance is notified to the user, according to the state of grass.

In the state of the lawn area 3 included in the state of lawn mowing work, a size and a shape (a two-dimensional shape, or three-dimensional shape including convex and concave portions) of the lawn area 3 may be included.

Application of the present invention is not limited to unmanned lawn mowers that perform lawn mowing while traveling without a human operator, but the present invention can be applied to any unmanned work machines that perform arbitrary work while traveling without a human operator.

REFERENCE SIGNS LIST

1 Unmanned lawn mowing system (unmanned work system)
2 Unmanned lawn mower (unmanned work machine)
3 Lawn area
6 Management server
8 Telecommunication circuit
20A Blade
24A Battery
30 Control unit
35 Camera
42 Information storage section
44 Information transmission section
46 Maintenance notification acquisition section
48 Maintenance notification display section
50 Machine type information
52 Operation information
52A Travel data
52B Cumulative work time
52C Image data
54 Failure information
56 Maintenance information
60 Unmanned lawn mower information acquisition section
64 Maintenance determination section
66 Maintenance notification transmission section (maintenance notification section)
68 Case storage section
68A Failure occurrence case
68B Performed maintenance case

The invention claimed is:

1. An unmanned work system comprising:
a plurality of unmanned work machines that perform work while traveling without a human operator; and
a management server, which is a computer,
each of the unmanned work machines and the management server communicating with each other,
wherein each of the unmanned work machines includes a processor that functions as an information transmission section that transmits operation information including information indicating a work state to the management server, and
the computer of the management server functions as a case storage section that stores a case related to a failure in and/or a case related to maintenance of each of the unmanned work machines in association with the operation information from each unmanned work machine from which the case or cases derive;
a maintenance determination section that determines, when the operation information is transmitted from the unmanned work machines, whether or not maintenance of the unmanned work machines is necessary, based on the case associated with operation information identical or similar to the operation information; and
a maintenance notification section that notifies maintenance to the unmanned work machines, based on a determination result made by the maintenance determination section,
wherein each of the unmanned work machines includes a blade for mowing lawn grass, and a camera that shoots a cut surface of the lawn grass mown by the blade and a lawn area of a mowing-target
the operation information includes information related to a load at time of lawn mowing work for mowing lawn grass, and image data obtained by shooting with the camera,
the operation information including the information related to the load, the case related to abrasion of the blade and/or the case related to dirt on a relevant one of the unmanned work machines are stored in the case storage section in association with each other, and
the maintenance determination section identifies either the abrasion of the blade or the dirt on the relevant unmanned work machine, based on the information related to the load and the image data of the cut surface of the lawn grass and the lawn area.

2. The unmanned work system according to claim 1, wherein when the case related to a failure and/or the case related to maintenance occurs, each of the unmanned work machines transmits the case or cases, along with the operation information, to the management server, and
the case storage section of the management server stores the case or cases and the operation information transmitted from the unmanned work machines.

3. The unmanned work system according to claim 1, wherein one or more pieces of information at least serving as a criterion or criteria to determine occurrence of the failure and/or a criterion or criteria to determine necessity of the maintenance, of information included in the operation information, are stored in association with the case or cases.

4. The unmanned work system according to claim 1, wherein the maintenance determination section identifies either the abrasion of the blade or the dirt on the relevant unmanned work machine when an average load value indicated by the information related to the load exceeds a predetermined threshold value.

5. A management server that is a computer and that mutually communicates with unmanned work machines that perform work while traveling without a human operator, the computer functions as:
a case storage section that stores a case related to a failure in and/or a case related to maintenance of each of the unmanned work machines in association with operation information including information indicating a work state of each unmanned work machine from which the case or cases derive;
an information acquisition section that acquires the operation information from the unmanned work machines;
a maintenance determination section that determines whether or not maintenance of the unmanned work machines is necessary, based on the case associated with operation information identical or similar to the operation information acquired by the information acquisition section; and
a maintenance notification section that notifies maintenance to the unmanned work machines, based on a determination result made by the maintenance determination section,
wherein each of the unmanned work machines includes a blade for mowing lawn grass, and a camera that shoots a cut surface of the lawn grass mown by the blade and a lawn area of a mowing-target,
the operation information includes information related to a load at time of lawn mowing work for mowing lawn grass and image data obtained by shooting with the camera, and
the operation information including the information related to the load and the case related to abrasion of the blade and/or the case related to dirt on a relevant one of the unmanned work machines are stored in the case storage section in association with each other, and
the maintenance determination section identifies either the abrasion of the blade or the dirt on the relevant unmanned work machine, based on the information related to the load and the image data of the cut surface of the lawn grass and the lawn area.

6. An unmanned work machine that performs work while traveling without a human operator and mutually communicates with a management server, the unmanned work machine comprising a processor that functions as:
an information transmission section that transmits operation information including information indicating a work state; and,
a maintenance notification acquisition section that acquires a maintenance notification notifying maintenance from the management server,
the unmanned work machine comprising:
a blade for mowing lawn grass, and
a camera that shoots a cut surface of the lawn grass mown by the blade and a lawn area of a mowing-target,
wherein the maintenance notification is generated by the management server, based on, of cases related to a failure and/or cases related to maintenance stored in association with the operation information from unmanned work machines, a case associated with operation information identical or similar to the operation information transmitted by the information transmission section,
the operation information includes information related to a load at time of lawn mowing work for mowing lawn grass and image data obtained by shooting with the camera, the operation information including the information related to the load and the case related to abrasion of the blade and/or the case related to dirt on the unmanned work machine are stored in the management server in association with each other, and the maintenance notification is generated based on the information related to the load and the image data of the cut surface of the lawn grass and the lawn area.

7. The unmanned work system according to claim 2, wherein one or more pieces of information at least serving as a criterion or criteria to determine occurrence of the failure and/or a criterion or criteria to determine necessity of the maintenance, of information included in the operation information, are stored in association with the case or cases.

8. The unmanned work system according to claim 2, wherein each of the unmanned work machines includes a camera that shoots a cut surface of the lawn grass mown by the blade and a mowing-target lawn area, the operation information includes image data obtained by shooting with the camera, and when an average load value indicated by the information related to the load exceeds a predetermined threshold value, the maintenance determination section identifies either the abrasion of the blade or the dirt on the relevant unmanned work machine, based on the image data of the cut surface of the lawn grass and the lawn area.

9. The unmanned work system according to claim 3, wherein the maintenance determination section identifies either the abrasion of the blade or the dirt on the relevant unmanned work machine when an average load value indicated by the information related to the load exceeds a predetermined threshold value.

\* \* \* \* \*